United States Patent [19]

Seki et al.

[11] Patent Number: 4,961,150
[45] Date of Patent: Oct. 2, 1990

[54] CURVE GENERATING METHOD USING TANGENT VECTORS

[75] Inventors: Masaki Seki; Koji Samukawa; Osamu Hanaoka, all of Tokyo, Japan

[73] Assignee: Fanuc Ltd., Yamanashi, Japan

[21] Appl. No.: 199,044

[22] PCT Filed: Aug. 26, 1987

[86] PCT No.: PCT/JP87/00628
§ 371 Date: May 2, 1988
§ 102(e) Date: May 2, 1988

[87] PCT Pub. No.: WO88/02153
PCT Pub. Date: Mar. 24, 1988

[30] Foreign Application Priority Data

Sep. 10, 1986 [JP] Japan .................... 61-211395

[51] Int. Cl.$^5$ .................... G05B 19/403
[52] U.S. Cl. .................... 364/474.29; 318/573; 364/474.31
[58] Field of Search .................... 364/474.29, 474.31, 364/577, 723; 318/569, 570, 573

[56] References Cited

U.S. PATENT DOCUMENTS

| 4,031,369 | 6/1977 | Heaman et al. | 364/474.29 X |
| 4,158,887 | 6/1979 | Kosugi | 364/723 |
| 4,559,601 | 12/1985 | Kishi et al. | 364/474.03 X |
| 4,648,024 | 3/1987 | Kato et al. | 364/474.29 |
| 4,663,726 | 5/1987 | Chand et al. | 364/474.31 X |
| 4,794,540 | 12/1988 | Gutman et al. | 364/474.29 |

Primary Examiner—Joseph Ruggiero
Attorney, Agent, or Firm—Staas & Halsey

[57] ABSTRACT

The method of the invention includes determining a circular arc (CAR) passing through three discretely given consecutive points ($P_{i-1}$, $P_i$, $P_{i+1}$), determining a tangent vector of a tangent line contacting the circular arc (CAR) at the central point ($P_i$) of these three points, thereafter performing a spline interpolation between the two points $P_{i-1}$, $P_i$ using position vectors and tangent vectors at the points ($P_{i-1}$, $P_i$), thereby obtaining a curve smoothly connecting the two points $P_{i-1}$, $P_i$, and thereafter determining a point sequence connecting curve (CVL) by similarly performing an interpolation between every two adjacent consecutive points.

5 Claims, 5 Drawing Sheets

CURVE GENERATING METHOD USING TANGENT VECTORS

BACKGROUND OF THE INVENTION

1. Field of the Invention

This invention relates to a curve generating method and, more particularly, to a method of generating a three-dimensional curve which becomes necessary when generating a curved surface.

2. Description of the Related Art

Figure 5A:
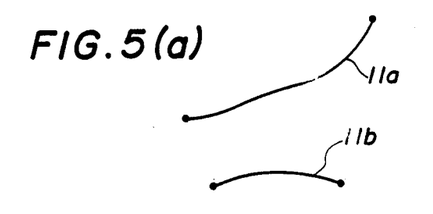
FIGS. 5(a)-5(d) for describing a method of generating a curved surface.
Figure 5B:
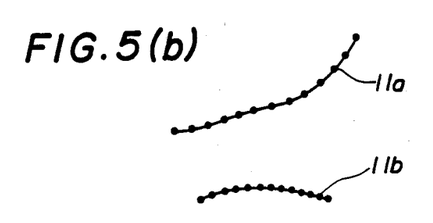
Figure 5C:
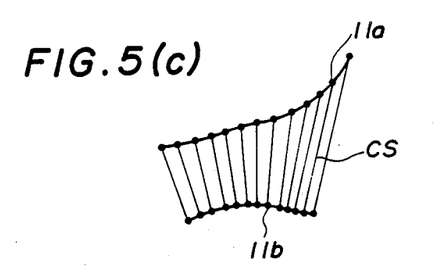
Figure 5D:
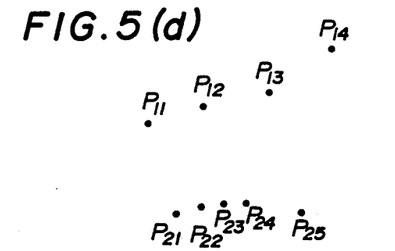

A curved surface of a three-dimensional metal mold or the like on a design drawing is generally expressed by a plurality of section curves, but no profile data is shown for the shape of the area lying between a certain section curve and the next adjacent section curve. In numerically controlled machining it is essential that machining be carried out so as to smoothly connect these two section curves despite the fact that the profile between them is not given In other words, this means that machining must be performed by generating the curved surface between the two section curves from such data as that indicative of the section curves, recording on an NC tape the data concerning the generated curved surface, and carrying out machining in accordance with commands from the NC tape. To this end, there has been proposed a method of generating the curved surface of a three-dimensional curved body in accordance with predetermined rules using data (e.g. section curves and the like) specifying the three-dimensional curved body FIGS. 5(a)-(d) for describing a curved surface generating method, in which a curved surface CS [see FIG. 5(c)]is generated by providing three-dimensional curves (reference curves) 11a, 11b [see FIG. 5(a)]of a curved surface cut by a predetermined section, dividing each of the reference curves 11a, 11b into N equal segments [see FIG. 5(b)], and connecting corresponding ones of the partitioning points by straight lines In this curved surface generating method, the reference curves 11a, 11b, which are the three-dimensional curves, must be specified. To this end, a sequence of discrete points $P_{1i}$ ($x_i, y_i, z_i$) (i=1,2, ...) is given with regard to the reference curve 11a, as shown in FIG. 5(d), a sequence of discrete points $P_{2j}(x_j, y_j, z_j)$ (j=1,2,...) is given with regard to the reference curve 11b. and curves (reference curves) connecting these point sequences are obtained by performing interpolation between points so as to smoothly connect the respective point sequences.

In this conventional method of generating the point sequence connecting curves, it is necessary to determine a tangent vector at each point However, the method of determining these tangent vectors is a major undertaking requiring matrix computations, inverse matrix computations, etc., and it is impossible for an ordinary curved surface generating apparatus on the personal computer level to determine the tangent vectors.

SUMMARY OF THE INVENTION

Accordingly, an object of the present invention is to provide a curve generating method through which tangent vectors can be determined in a simple manner, thus making it possible to simply obtain curves smoothly connecting point sequences.

The method of the present invention includes determining a circular arc passing through three discretely given consecutive points $P_{i-1}$, $P_i$, $P_{i+1}$, determining a tangent vector of a tangent line contacting the circular arc at the central point $P_i$ of these three points, thereafter performing a spline interpolation between the two points $P_{i-1}$, $P_i$ using position vectors and tangent vectors at the points $P_{i-1}$, $P_i$, thereby obtaining a curve smoothly connecting the two points $P_{i-1}$, $P_i$, and thereafter determining a point sequence connecting curve by similarly performing an interpolation between every two consecutive points discretely given.

DETAILED DESCRIPTION OF THE PREFERRED EMBODIMENT

Figure 1:
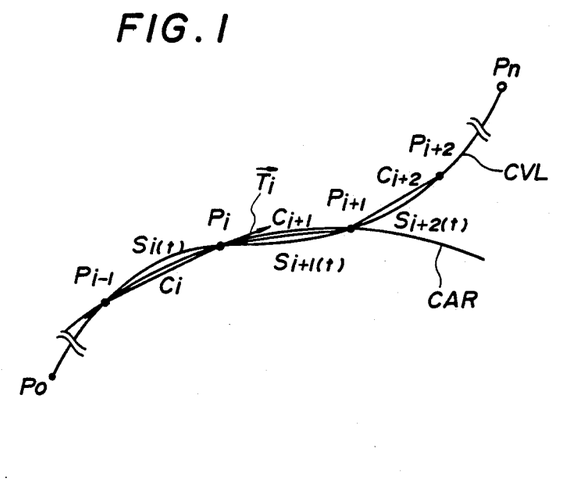
FIG. 1 is a view for describing the general features of the present invention.

FIG. 1 is a view for describing the general features of the present invention.

$P_i$ (i=1, 2,... n) represents a sequence of points, CVL a curve smoothly connecting the sequence of points, CAR a circular arc passing through three consecutive points, $C_i$ the linear distance between adjacent points, and $S_i(t)$ the coordinates of a point on the curve CVL.

The circular arc CAR passing through three discretely given consecutive points $P_{i-1}$, $R_i$, $R_{i+1}$ is determined, followed by determining a tangent vector $\vec{T}_i$ of a tangent contacting the circular arc at the central point $P_i$. A tangent vector $\vec{T}_{i-1}$ at the point $P_{i-1}$ is then found in similar fashion.

Next, by using position vectors $\vec{P}_{i-1}$, $\vec{P}_i$ and tangent vector $\vec{T}_{i-1}$, $\vec{T}_i$ at the points $P_{i-1}$, $P_i$, a spline interpolation is performed between the two points $P_{i-1}$, $P_i$ to obtain the coordinates $S_i(t)$ (where t is a value increased at increments of 0.1 from 0 to 1), and a curve which smoothly connects the two points $P_i$, $P_{i+1}$ is determined.

Figure 2:
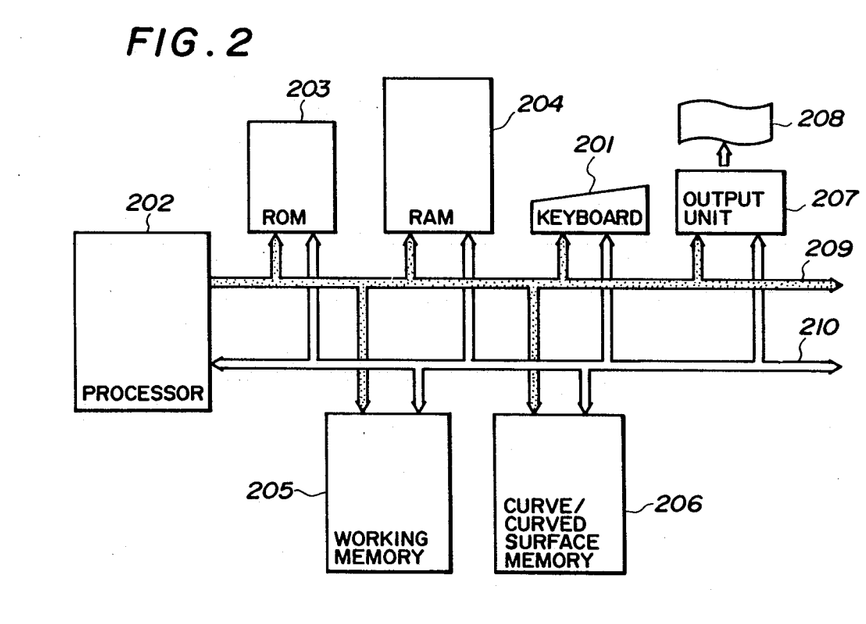
FIG. 2 is a block diagram of an apparatus for practicing the present invention.
Figure 3:
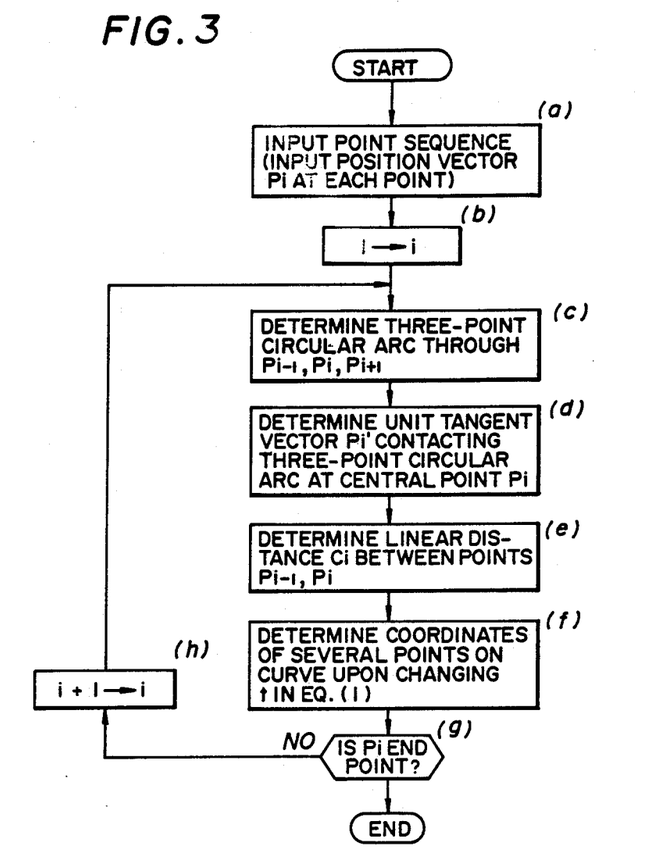
FIG. 3 is a flowchart of processing according to the present invention.

Thereafter, and in similar fashion, the point sequence connecting curve CVL is obtained by performing an interpolation between every two consecutive points of the discretely given points invention, and FIG. 3 is a flowchart of processing In FIG. 2, numeral 201 denotes a keyboard for data input, 202 a processor, 203 a ROM for storing a control program, 204 a RAM, 205 a working memory, 206 a curve/curved surface memory for storing generated curve and curved surface data, 207 an output unit for outputting generated curved surface data to an external storage medium 208 such as a paper tape or magnetic tape, 209 an address bus, and 210 a data bus Processing for generating a curve in accordance with the invention will now be described in accordance with the flowchart of FIG. 3.

(a) First, data specifying a three-dimensional curved surface, e.g. a point sequence (a position vector $P_i$ at each point) specifying the curve CVL (FIG. 1), is inputted from the keyboard 201.

(b) Next, the processor performs the operation 1 →1.

(c) Thereafter, the circular arc CAR (see FIG. 1) passing through the discretely given three consecutive points $P_{i-1}$, $P_i$, $P_{i+1}$ is found.

(d) When the circular arc CAR has been found, a unit tangent vector $\vec{P_i}$ of a tangent line contacting the circular arc CAR at the central point $P_i$ is obtained.

(e) Next, the linear distance $C_i$ between the point $P_{i-1}$ and the point $P_i$ is computed.

(f) When the distance $C_i$ has been found, the coordinates $S_i(t)$ of points on the curve smoothly connecting the points $P_{i-1}$, $P_i$ pare computed by varying t over a range of from 0 to 1, namely by performing spline interpolation, in accordance with the following equation:

$$S_i(t) = [t^3\ t^2\ t\ 1] \begin{pmatrix} 2 & -2 & 1 & 1 \\ -3 & 3 & -2 & -1 \\ 0 & 0 & 1 & 0 \\ 1 & 0 & 0 & 0 \end{pmatrix} \begin{pmatrix} \vec{P_{i-1}} \\ \vec{P_i} \\ \vec{T_{i-1}} \\ \vec{T_i} \end{pmatrix} \quad (1)$$

where $\vec{T_{i-1}} = C_i \vec{P'_{i-1}}$, $\vec{T_i} = C_i \vec{P'_i}$

In Eq. (1), $S_i(t)$ represents the coordinates of point $P_{i-1}$ if t=0, the coordinates of point $P_i$ if t=1, and the coordinates of the midpoint if t=0.5. Accordingly, nine points between points $P_{i-t}$, $P_i$ are obtained by incrementing t at 0.1, interpolation is performed over this interval, and the coordinates of each point are stored in the memory 206. It should be noted that Eq. (1) is an induction equation of a Ferguson curve segment.

(g) Next, it is determined whether the point $P_i$ is the end point of the curve If $P_i$ is the end point, & curve generation processing is terminated (h) If the point $P_i$ is not the end point of the curve, however, i is incremented by the operation $i+1 \rightarrow i$ and processing is repeated from step (c) onward to perform interpolation between every two consecutive points discretely given, whereby a point sequence connecting curve is obtained.

Figure 4:
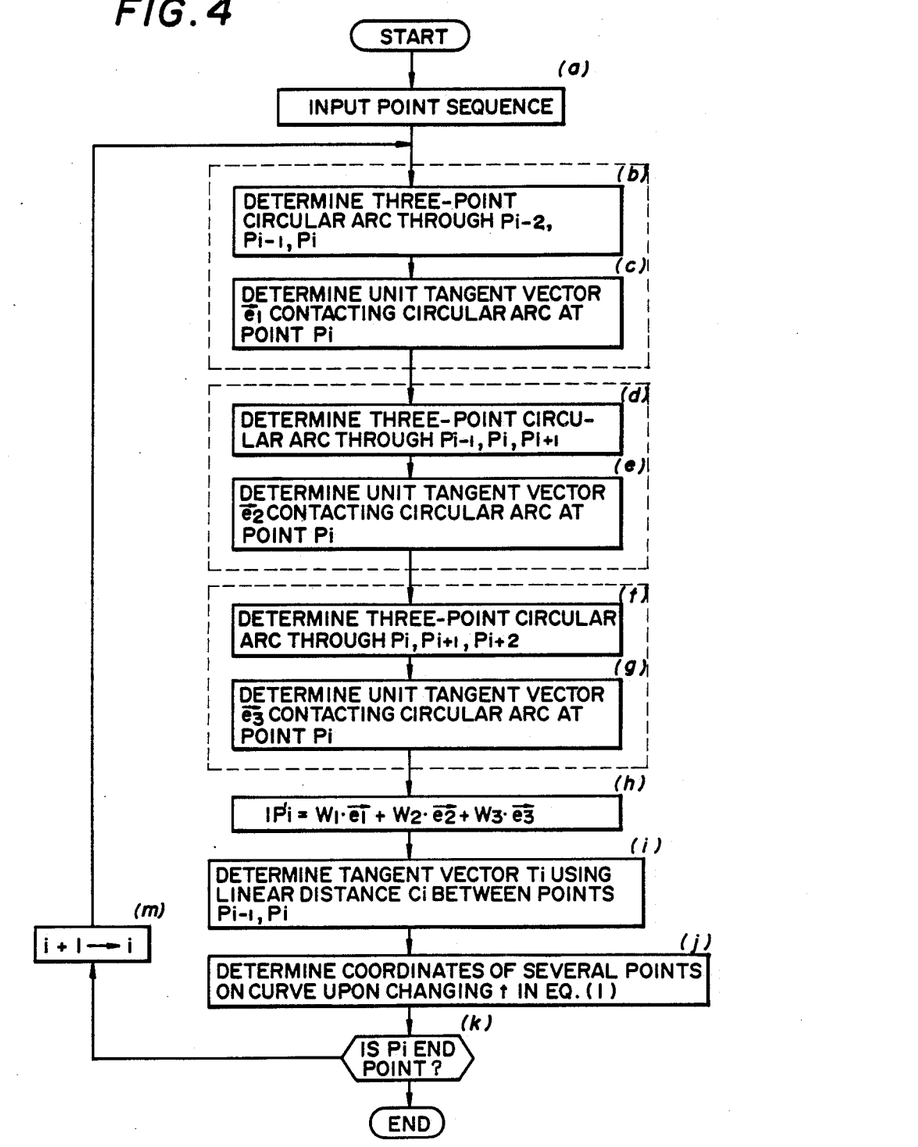
FIG. 4 is a flowchart of different processing according to the present invention.

The processing of FIG. 3 is for a case where a tangent vector is found using three consecutive points However, a tangent vector can also be obtained by using five consecutive points. FIG. 4 is a flowchart for obtaining a tangent vector using five points, and obtaining a curve using the tangent vector.

(a) First, data specifying a three-dimensional curved surface, e.g. a point sequence (a position vector $P_i$ at each point) specifying a curve is inputted from the keyboard 201.

(b) Thereafter, a circular arc passing through three discretely given consecutive points $P_{i-2}$, $P_{i-1}$, $P_i$ is found.

(c) When the circular arc has been found, a unit tangent vector $\vec{e_1}$ of a tangent line contacting the circular arc at a point $P_i$ at the right end is obtained (d) Next, a circular arc passing through the three discretely given consecutive points $P_{i-1}$, $P_i$, $P_{i+1}$ is found.

(e) When the circular arc has been found, a unit tangent vector $\vec{e_2}$ of a tangent line contacting the circular arc at the central point $P_i$ is obtained.

(f) Next, a circular arc passing through the three discretely given consecutive points $P_i$, $P_{i+1}$, $P_{i+2}$ is found.

(g) When the circular arc has been found, a unit tangent vector $\vec{e_3}$ of a tangent line contacting the circular arc at a point $P_i$ at the left end is obtained (h) When the unit tangent vector $\vec{e_1}$-$\vec{e_3}$ have been obtained, a unit tangent vector $\vec{P'_i}$ at the point $P_i$ is found in accordance with the following equation:

$$\vec{P'_i} = w_1 \cdot \vec{e_1} + w_2 \cdot \vec{e_2} + w_3 \cdot \vec{e_3} \quad (2)$$

In the above $w_i$ (i=1, 2, 3) is a weighting coefficient obtained in accordance with the following equation so that the unit tangent vector where the interval between points is small will be reflected in the curve:

$$w_1 = 1 - (C_i + C_{i-1})/(C_{i-1} + 2C_i + 2C_{i+1} + C_{i+2})$$

$$w_2 = 1 - (C_i + C_{i+1})/(C_{i-1} + 2C_i + 2C_{i+1} + C_{i+2})$$

$$w_3 = 1 - (C_{i+1} + C_{i+2})/(C_{i-1} + 2C_i + 2C_{i+1} + C_{i+2})$$

where the distance between points $P_{i-2}$, $P_{i-1}$ is $C_{i-1}$, the distance between points $P_{i-1}$, $P_i$ is $C_i$, the distance between points $P_i$, $P_{i+1}$ is $C_{i+1}$, and the distance between points $P_{i+1}$, $P_{i+2}$ is $C_{i+2}$.

(i) Next, the tangent vector $T_i$ is computed in accordance with the equation $$\vec{T_i} = C_i \vec{P'_i}$$

using the linear distance $C_i$ between the point $P_{i-1}$ and the point $P_i$.

(j) This is followed by varying t over the range of from 0 to 1 in accordance with Eq. (1) to compute the coordinates $S_i(t)$ of points on the curve smoothly connecting the points $P_{i-1}$, $p_i$.

(k) Next, it is determined whether the point $P_i$ is the end point of the curve. If $P_i$ is the end point, curve generation processing is terminated.

(m) If the point $P_i$ is not the end point of the curve, however, i is incremented by the operation $i+1 \rightarrow i$ and processing is repeated from step (b) onward to perform interpolation between every two consecutive points discretely given, whereby a point sequence connecting curve is obtained.

In accordance with the present invention, the arrangement is such that a tangent vector at each point of a point sequence is obtained by using three or five consecutive points. As a result, tangent vectors can be obtained in a simple manner and, hence, a curve smoothly connecting the point sequence can be obtained in simple fashion.

With the method of obtaining tangent vectors in accordance with Eq. (2) using five points, a curve can be minutely altered by changing the manner in which each weighting coefficient is decided, thereby making it possible to generate the desired curve.

We claim:

1. A method of machining a three-dimensional curved surface comprising the steps of:

(a) detecting a circular arc passing through three discretely given consecutive points $P_{i-1}$, $P_i$, $P_{i+1}$ of the curved surface;

(b) determining a tangent vector of a tangent line contacting said circular arc at the central point $P_i$ of said three points;

(c) determining a curve smoothly connecting the two points $P_{i-1}$, $P_i$ by performing a spline interpolation between the two points $P_{i-1}$, $P_i$ using position vectors $P_{i-1}$, $P_i$ at the points $P_{i-1}$, $P_i$ and tangent vectors $T_{i-1}$, $T_i$ at the points $P_{i-1}$, $P_i$ determined in step (b);

(d) determining a point sequence connecting curve by performing a spline interpolation between every two adjacent consecutive points; and machining the three-dimensional curved surface according to the point sequence connecting curve.

2. A method of machining according to claim 1, wherein a curve $S_i(t)$ determined in step (c) between the two points $P_{i-1}$, $P_i$ is expressed by the following equation;

$$S_i(t) = [t^3 t^2 t 1] \begin{pmatrix} 2 & -2 & 1 & 1 \\ -3 & 3 & -2 & -1 \\ 0 & 0 & 1 & 0 \\ 1 & 0 & 0 & 0 \end{pmatrix} \begin{pmatrix} P_{i-1} \\ P_i \\ T_{i-1} \\ T_i \end{pmatrix}$$

and the spline interpolation is performed between the points $P_{i-1}$, $P_i$ by varying t over a range of from 0 to 1.

3. A method of machining according to claim 1, wherein step (b) is performed by computing said tangent vector in accordance with the following equation:

$$\vec{T_i} = C_i \vec{P_i},$$

where $\vec{P_i}$, represents a unit vector of a tangent line contacting the circular arc at the point $P_i$, and $C_i$ represents the distance between the two points $P_{i-1}$, $P_i$.

4. A method of machining a three-dimensional curved surface comprising the steps of:

(a) determining a circular arc having left and right ends and passing through three discretely given consecutive points $P_{i-2}$, $P_{i-1}$, $P_i$ and determining a unit tangent vector $e_1$ of a tangent line contacting said circular arc at a point $P_i$ on the right end;

(b) determining a circular arc passing through three discretely given consecutive points $P_{i-1}$, $P_i$, $P_{i+1}$ and determining a unit tangent vector $e_2$ of a tangent line contacting said circular arc at a central point $P_i$;

(c) determining a circular arc passing through three discretely given consecutive points $P_i$, $P_{i+1}$, $P_{i+2}$ and determining a unit tangent vector $e_3$ of a tangent line contacting said circular arc at the point $P_i$ on the left end;

(d) increasing the weighting $w_i$ (i=1-3) of a unit normal vector $e_i$ where the distance between two points is short, and determining a unit tangent vector $P_i$, at the point $P_i$ in accordance with the equation $$P_i' = w_1 e_1 + w_2 e_2 + w_3 e_3;$$

(e) computing a tangent vector in accordance with the following equation:

$$T_i = C_i P_i'$$

where $C_i$ represents the distance between the two points $P_{i-1}$, $P_i$;

(f) determining a curve smoothly connecting said two points $P_{i-1}$, $P_i$ by performing a spline interpolation between the two points, $P_{i-1}$, $P_i$ using tangent vectors $P_{i-1}$, $P_i$ at the points $P_{i-1}$, $P_i$ and position vectors $T_{i-1}$, $T_i$ at the points $P_{i-1}$, $P_i$;

(g) determining a point sequence connecting curve by performing a spline interpolation between every two adjacent consecutive points; and matching the three-dimensional curved surface according to the point sequence connecting curve.

5. A method of machining according to claim 4, characterized in that, in said sixth step, a curve $S_i(t)$ between the two points $P_{i-1}$, $P_i$ is expressed by the following equation:

$$S_i(t) = [t^3 t^2 t 1] \begin{pmatrix} 2 & -2 & 1 & 1 \\ -3 & 3 & -2 & -1 \\ 0 & 0 & 1 & 0 \\ 1 & 0 & 0 & 0 \end{pmatrix} \begin{pmatrix} P_{i-1} \\ P_i \\ T_{i-1} \\ T_i \end{pmatrix}$$

and the spline interpolation is performed between the points $P_i$, $P_{i+1}$ by varying t over a range of from 0 to 1.

* * * * *

UNITED STATES PATENT AND TRADEMARK OFFICE
CERTIFICATE OF CORRECTION

PATENT NO. : 4,961,150

DATED : October 2, 1990

INVENTOR(S) : Masaki Seki et al.

It is certified that error appears in the above-identified patent and that said Letters Patent is hereby corrected as shown below:

Col. 1, line 20, after "given" insert a period;
line 31, after "body" insert a period;
line 34, change "5(c)]is" to --5(c)] is--;
line 39, after "lines" insert a period;
line 53, after "point" insert a period.

Col. 2, line 21, before "for" insert --are views--;
line 34, change "$R_i$, $R_{i+1}$" to --$P_i$, $P_{i+1}$--;
line 50, after "points" insert a period,
and before "invention" insert the following
as a new paragraph:
--Fig. 2 is a block diagram of an embodiment
of the--;
line 51, after "processing" insert a period.

UNITED STATES PATENT AND TRADEMARK OFFICE
CERTIFICATE OF CORRECTION

PATENT NO. : 4,961,150

DATED : October 2, 1990

INVENTOR(S) : Masaki Seki et al.

It is certified that error appears in the above-identified patent and that said Letters Patent is hereby corrected as shown below:

Col. 3, line 11, change "pare" to --are--;
first chart should read as follows:

$$S_i(t) = [t^3 t^2 t^1] \begin{bmatrix} 2 & -2 & 1 & 1 \\ -3 & 3 & -2 & -1 \\ 0 & 0 & 1 & 0 \\ 1 & 0 & 0 & 0 \end{bmatrix} \begin{Bmatrix} \vec{P}_{i-1} \\ \vec{P}_i \\ \vec{T}_{i-1} \\ \vec{T}_i \end{Bmatrix}$$

line 35, after "curve" (first occurrence) insert a period, and delete "&";
line 36, after "terminated" insert a period;
line 44, after "points" insert a period.

Col. 4, line 59, change "detecting" to --determining--.

UNITED STATES PATENT AND TRADEMARK OFFICE
CERTIFICATE OF CORRECTION

PATENT NO. : 4,961,150

DATED : October 2, 1990

INVENTOR(S) : Masaki Seki et al.

It is certified that error appears in the above-identified patent and that said Letters Patent is hereby corrected as shown below:

Col. 5, first chart should read as follows:

$$S_i(t) = [t^3 t^2 t^1] \begin{bmatrix} 2 & -2 & 1 & 1 \\ -3 & 3 & -2 & -1 \\ 0 & 0 & 1 & 0 \\ 1 & 0 & 0 & 0 \end{bmatrix} \begin{bmatrix} \vec{P}_{i-1} \\ \vec{P}_i \\ \vec{T}_{i-1} \\ \vec{T}_i \end{bmatrix}$$

Col. 6, first chart should read as follows:

$$S_i(t) = [t^3 t^2 t^1] \begin{bmatrix} 2 & -2 & 1 & 1 \\ -3 & 3 & -2 & -1 \\ 0 & 0 & 1 & 0 \\ 1 & 0 & 0 & 0 \end{bmatrix} \begin{bmatrix} \vec{P}_{i-1} \\ \vec{P}_i \\ \vec{T}_{i-1} \\ \vec{T}_i \end{bmatrix}$$

Signed and Sealed this

Twenty-first Day of January, 1992

*Attest:*

HARRY F. MANBECK, JR.

*Attesting Officer*  *Commissioner of Patents and Trademarks*